United States Patent [19]

Leri

[11] 4,301,528
[45] Nov. 17, 1981

[54] TONE ARM MECHANISM

[75] Inventor: Dennis A. Leri, Sharon, Mass.

[73] Assignee: Teledyne Industries, Inc., Los Angeles, Calif.

[21] Appl. No.: 43,352

[22] Filed: May 29, 1979

[51] Int. Cl.³ .............................................. G11B 3/10
[52] U.S. Cl. .................................. 369/221; 369/215; 369/233; 369/230
[58] Field of Search ...................................... 274/23 R

[56] References Cited

U.S. PATENT DOCUMENTS

| | | | |
|---|---|---|---|
| 3,623,734 | 11/1971 | Sakamoto et al. | 274/23 R |
| 4,102,536 | 7/1978 | Cluris | 274/23 R |
| 4,105,961 | 8/1978 | Plummer et al. | 274/23 R |
| 4,143,879 | 3/1979 | Wren | 274/23 R |
| 4,214,756 | 7/1980 | Ohmura | 274/23 R |

Primary Examiner—Steven L. Stephan
Attorney, Agent, or Firm—Schiller & Pandiscio

[57] ABSTRACT

A tone arm system for a record player is provided having servo-controlled record warp compensation means including a moving coil motor for driving the tone arm vertically and a moving magnet motor for driving the tone arm horizontally in response to servo-currents.

4 Claims, 4 Drawing Figures

TONE ARM MECHANISM

The present invention relates in general to new and improved tone arm systems for high fidelity record players and in particular to a tone arm system in which unwanted arm motion, such as that produced by a warped recording, can be controlled.

Proper stylus tracking is essential to the high fidelity reproduction of recorded signals in a phonographic type of record player and requires that the stylus be in contact with the walls of the record groove at all times. Modulations in the groove, such as high velocity, high frequency audio signals, lead-in and lead-out transitions, record warps and low frequency audio signals having large excursions, can generate substantial upward forces. These forces are primarily reactive, corresponding to the accelerations of the stylus tip mass at high frequencies and, at low frequencies, to the effective mass of the tone arm system which includes the tone arm as well as the cartridge normally carried by the latter.

If the sum of these forces exceeds the downward-acting tracking force, mistracking will occur, i.e. the stylus will leave its groove. Any reduction of the tracking force, e.g. for the purpose of reducing wear on the record and on the stylus, will only increase the probability of mistracking unless the stylus reactive forces caused by groove modulations can also be reduced. The problem is particularly pronounced with respect to low frequency tracking behavior, e.g. the tracking on a warped record of recorded low audio frequency signals having large excursions, due to the fact that record warps usually exhibit a predominant frequency range from 0.5 to 10.0 Hz, while the audio frequency range generally begins in the vicinity of 30 Hz.

Various solutions have been proposed in the past in an attempt to track warped records without the necessity for applying unduly large tracking forces detrimental to the record grooves and to the stylus. Many of these systems employ a servo mechanism whereby unwanted arm excursions due to record warp or the like are compensated by a servo-motor driven by a signal derived from detection of the unwanted excursion. For example, the system disclosed in U.S. Pat. No. 3,830,505 to J. Rabinow, uses either a low pass filter to separate the cartridge signals from the audio output, or a pickup device separated from the cartridge and stylus to isolate it from the audio signals. The servo feedback signal so obtained is amplified and energizes a single linear magnetic motor to apply to the tone arm a vertical compensating force intended to keep the cartridge from changing its position relative to the surface of the record. The design of the Rabinow tone arm is unique and one would not expect to build it from readily available stock components.

A similar system is disclosed in U.S. Pat. No. 3,632,734 to N. Sakamoto wherein servo action is again used to maintain the pickup in a position which is at a predetermined distance from the disk surface. In the system disclosed in this patent the feedback signal is used to drive either a single "dynamic" motor or piezo-electric means coupled to either the tone arm or cartridge for moving the latter vertically, or is used to operate a pair of moving coil motors connected to the tone arm and positioned to drive normally to one another along axes disposed at 45° to the axis of the tone arm. To convert a conventional tone arm to the Sakamoto model would require very extensive changes.

The general concept of the feedback and detection aspects of the Sakamoto patent are described above as set forth in French Pat. No. 1,449,045, which however teaches moving the tone arm by a single vertically-driving motor in response to the feedback signal, much as in the Rabinow patent.

Experience has shown that the operation of a tone arm system wherein the servo action is directed to maintaining the cartridge position constant relative to the surface of the record does not provide optimum performance, particularly in the low frequency range. In such a system, record warp still produces occasional mistracking, particularly at the desired low levels of tracking force. If relatively high tracking forces are used to avoid the mistracking of warped records, particularly in the low audio frequency range, wear on the record and on the stylus are increased.

Record warp rarely is ever purely radial, but it instead usually skewed to some degree. Hence, the force generated on the tone arm by the record warp will usually possess lateral, i.e. horizontal, as well as vertical components although the latter tend to predominate. Such lateral forces, which the prior art generally appears to have ignored, are particularly undesirable in stereo recordings as impairing the desired balance.

It is a primary object of the present invention to provide a tone arm system for a high fidelity record player wherein improved performance over comparable prior art systems is obtained.

It is another object of the present invention to provide an improved tone arm system wherein one may use any of several types of cartridges (capacitive, moving coil or moving magnet) while still maintaining low tracking forces.

It is still another object of the present invention to provide a servo-controllable tone arm system wherein the design permits production from stock components mainly.

Yet other objects of the present invention are to provide a servo-controllable tone arm system responsive to both vertical and horizontal stylus accelerations; to provide such a system in which a pair of motors are coupled to the tone arm for respectively driving the latter horizontally and vertically; and to provide such a two-motor system in which the vertical motor comprises a moving coil motor mounted in a magnetic field, the horizontal motor comprising a permanent magnet surrounding and movable with the main vertical pivot support shaft of the tone arm and electrical coil means electromagnetically couplable to the permanent magnet.

The foregoing and other objects of the present invention will become apparent from the following detailed specification considered in conjunction with the accompanying drawings, wherein FIG. 1 is a plan view, partly in fragment and partly in phantom, showing a conventional phonograph pickup arm embodying the principles of the present invention;

Figure 1:
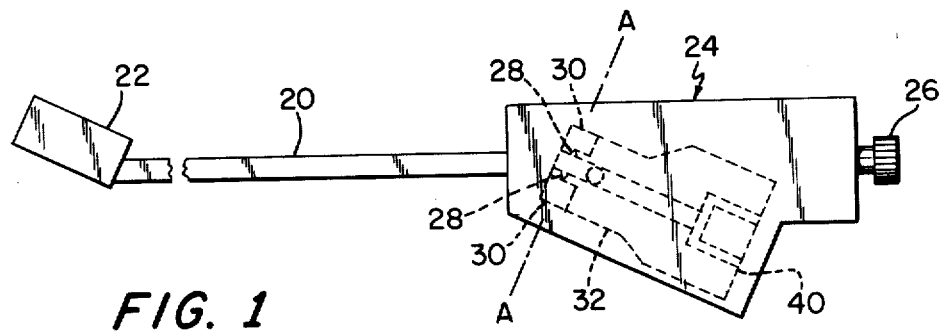

In FIG. 1, there is shown a conventional phonographic pickup arm 20 supporting at one end thereof a pickup cartridge 22 including the usual reproducing stylus (not shown) and connected at the opposite end to one end of coupler block 24. The opposite end of coupler block 24 supports counter-weight 26, block 24 being supported on horizontal pivots 28 for motion about axis A—A so as to be capable of being neutrally balanced in the vertical plane. Pivots 28 are mounted in suitable bearings (not shown) in respective arms 30 of one bifurcated end of yoke 32. The latter in turn is coupled for rotation with and extends perpendicularly to vertical pivot post 34 (the latter being also mounted in appropriate bearings (not shown)) so that arm 20 is rotatable around two axes, i.e. the axis A—A and the long axis of post 34. As thus described, the phonograph pickup system shown in FIG. 1 is quite conventional and can comprise any of a very large number of phonograph pickup systems currently commercially available for driving a stylus into playing contact with a conventional planar or disc-like recording medium, hence need be delineated no further.

Means are provided for detecting or sensing low frequency tracking behavior of the pickup arm relative to a recording i.e. to provide at least one signal responsive to motion of the arm perpendicularly to the plane of the recording medium, and another signal corresponding to arm motion parallel to the recording medium. To this end such detection means can be provided as separate sensing transducers as described in the above-identified Sakamoto et al patent or from cartridge 22 itself as described in copending patent application Ser. No. 43,353 filed concurrently herewith. The dual signal outputs from the low frequency detection means are used to control respectively the vertical and horizontal motion of the pickup arm according to well-known principles of closed-loop control systems, as the latter are for example described by Brown et al in *Principles of Servomechanisms*, J. Wiley & Sons, 1948.

Figure 2:
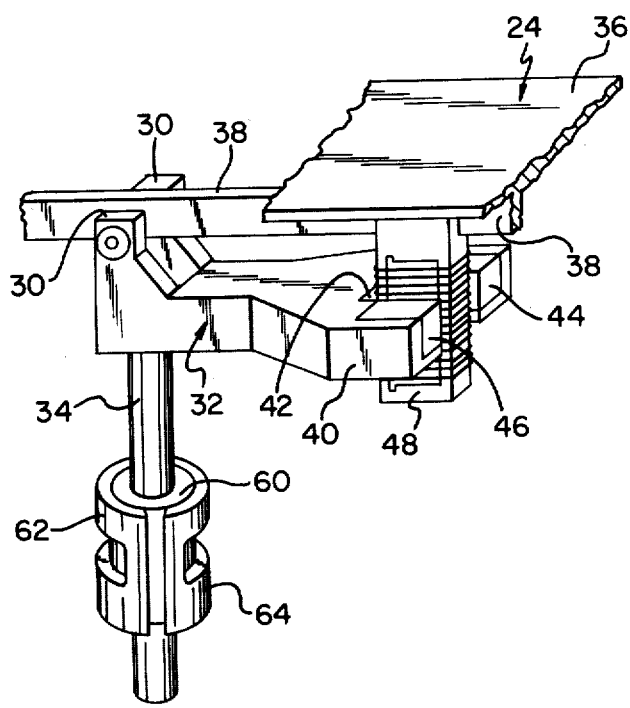
FIG. 2 is a perspective view, partly in fragment, of the motor drive systems of the present invention applied to a conventional pickup arm.
Figure 3:
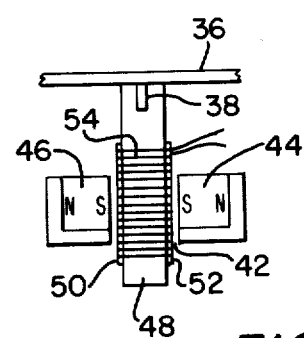
FIG. 3 is a partial end view of the embodiment of FIG. 2 showing the drive motor for moving the pickup arm about a horizontal pivot.

The principles of the present invention are embodied in the system shown in FIGS. 2 and 3 wherein block 24 is shown comprising cover plate 36 (shown only in fragment) coupled to longitudinal beam 38. The latter is supported as described in pivots 28 between arms 30 of yoke 32. End 40 of yoke 32 opposite to arms 30, is also bifurcated to define elongated slot 42, the axis of elongation of which extends vertically and perpendicularly to axis A—A. Mounted on interior portions of slot 42 in end 40 are a pair of permanent magnets 44 and 46 defining opposite edges of slot 42. Magnets 44 and 46 are disposed so that the portions thereof facing one another across slot 42 are of the same polarity, either both "north" or both "south", and are typically formed of cobalt-rare earth cermets.

Coupled to beam 38 and extending downwardly therefrom into slot 42 is a core or mandrel 48 formed of an electrically insulating dielectric such as a high molecular weight polymer or the like. Mounted on the sides of mandrel 48 facing magnets 46 and 44 are respective metallic plates 50 and 52 of relatively high magnetic permeability, typically soft steel or the like. Coil 54 of electrically conductive wire, such as copper or the like, is wound about mandrel 48 and plates 50 and 52 with the axis of the coil substantially perpendicular to axis A—A. The wire ends of coil 54 are intended to be coupled to a serve-electronic source of current (not shown but as described in the aforementioned copending patent application) varying proportionately to the low frequency vertical components of motion of pickup arm 20. It will be appreciated that magnets 46 and 44 together with coil 54 constitute a vertical "linear" motor which can be readily coupled to any of a number of commercially available pickup systems.

As current passes through coil 54, the interaction of the magnetic field induced in the coil with the permanent field of magnets 46 and 44 results in tone arm motion only in a vertical direction which is intended to be compensatory for undesired vertical low frequency motion of the tone arm due to, for example, record warp or the like. The up or down direction of tone arm motion due to the interaction of the fields of coil 54 and magnets 44 and 46 depends upon the polarity of the current fed into coil 54, and the vertical acceleration of the tone arm varies with the magnitude of that current.

Figure 4:
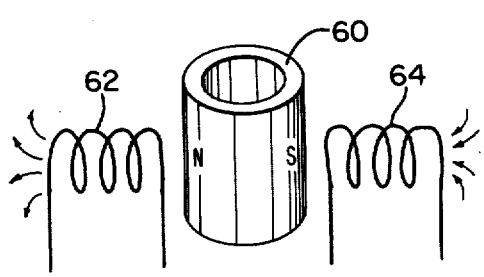
FIG. 4 is a schematic showing of the disposition of the magnetic element and field coils of the motor for driving the pickup arm about a vertical pivot.

Fixedly mounted on pivot post 34 so as to be rotatable therewith is permanent magnet 60 in the form of an annular cylinder coaxially disposed about post 34. Magnet 60 is typically made of a high coercive force material such as Alnico VIII or the like. Disposed on opposite cylindrical sides of magnet 60 and fixedly positioned on a suitable support (not shown) are a pair of coils 62 and 64 of electrically conductive wire such as copper, coils 62 and 64 being spaced apart from one another and from magnet 60 coaxially along an axis perpendicular to the cylindrical axis of magnet 60. Coils 62 and 64 are series connected and disposed so that when energized by a common current, opposite magnetic poles facing one another do thereby produce an aligned field. As shown schematically in FIG. 4, magnet 60 is polarized across its diameter, i.e. perpendicularly to the cylindrical axis thereof, with the axis of polarization also typically oriented perpendicularly to the common axis through coils 62 and 64. When the pickup arm is at the middle of its record playing arc, this orientation permits one to utilize the maximum torque output of the interaction between the field of magnet 60 and the aligned fields of coils 62 and 64 upon energization of the latter by an appropriate servo-current.

It will be apparent that the system thus described provides inexpensive compensation for mistracking in standard tone arms with only modest number of modifications and without major manufacturing redesign. The motor designs produce high torque with low power requirements in a manner which minimizes their space requirements.

With a belt drive turntable and using a standard cartridge (ADC XLM MKII) at a 1 gram track force on various test recordings, the system, when tested for response to various perturbations showed that the response below 20 Hz had been reduced by the present invention, by as much as 20 db, wow was reduced from 0.44% to 0.33%, flutter from 0.13% to 0.05% and rumble noise was down by about 16 db.

Since certain changes may be made in the above apertures without departing from the scope of the invention herein involved, it is intended that all matter contained in the above description or shown in the accompanying drawing shall be interpreted in an illustrative and not in a limiting sense.

What is claimed is:

1. In a phonograph record playing system having a support member providing horizontal pivotal supports, a movable tone arm mounted for rotation in a vertical plane about said pivotal supports, a vertical post mounted for rotation about its long axis, said support member being coupled to said shaft for rotation therewith, said tone arm bearing adjacent one end thereof a cartridge containing a stylus for contacting and playing a substantially planar recording disc, and sensor means for producing signals derived from the low frequency tracking behavior of said tone arm, the improvement comprising first motor means for moving said tone arm in substantially only a direction perpendicular to the plane of said disc, said first motor means being electrically coupled to be energized by selected portions of said signals, said first motor means comprising a yoke connected to and extending from said support member so as to define a slot extending parallel to said tone arm, a first coil mounted adjacent the opposite end of said tone arm and extending into said slot, said first coil being movable with said tone arm, said first coil being coupled to be energized by said selected portions of said signals, and means mounted on said yoke for providing a magnetic field disposed to interact with the field produced in said first coil by said selected portions of said signals, and second motor means coupled to said shaft for moving said shaft and tone arm together in substantially only a direction parallel to the plane of said disc, said second motor means being electrically coupled to provide tone arm movement responsively to other selected portions of said signals.

2. A phonograph record playing system as defined in claim 1 wherein said means for providing a magnetic field comprises a pair of magnets positioned on opposite sides of said slot with poles of like polarity facing one another across said slot.

3. A phonograph record playing system as defined in claim 1 wherein said second motor means comprises second magnet means mounted on said vertical post for movement therewith, and field coil means for providing responsively to said other selected portions of said signals, a magnetic field disposed to interact with the magnetic field of said second magnet means.

4. A phonograph record playing system as defined in claim 3 wherein said second magnet means comprises a cylindrical magnet polarized across its diameter and disposed coaxially about said vertical post for rotation with the latter, said field coil means comprising a series connected pair of coils disposed on opposite sides of said cylindrical magnet.

* * * * *